United States Patent
Luo et al.

(10) Patent No.: US 9,729,425 B2
(45) Date of Patent: Aug. 8, 2017

(54) TRANSFORMATION AND UNIFIED CONTROL OF HYBRID NETWORKS COMPOSED OF OPENFLOW SWITCHES AND OTHER PROGRAMMABLE SWITCHES

(71) Applicant: Futurewei Technologies, Inc., Plano, TX (US)

(72) Inventors: Min Luo, San Ramon, CA (US); Jiao Wang, Shenzhen (CN); Xiuli Zheng, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 706 days.

(21) Appl. No.: 14/071,329

(22) Filed: Nov. 4, 2013

(65) Prior Publication Data

US 2014/0149542 A1    May 29, 2014

Related U.S. Application Data

(60) Provisional application No. 61/731,391, filed on Nov. 29, 2012.

(51) Int. Cl.
*G06F 15/173* (2006.01)
*H04L 12/28* (2006.01)
(Continued)

(52) U.S. Cl.
CPC ............. *H04L 45/02* (2013.01); *H04L 41/12* (2013.01); *Y02B 60/43* (2013.01); *Y04S 40/164* (2013.01)

(58) Field of Classification Search
CPC .......... H04L 41/0213; H04L 29/08072; H04L 29/06; H04L 41/22; H04L 41/12;
(Continued)

(56) References Cited

U.S. PATENT DOCUMENTS 9,319,336 B2*  4/2016  Thakkar ................. H04L 47/50
9,319,337 B2*  4/2016  Koponen ............... G05B 11/01
(Continued)

FOREIGN PATENT DOCUMENTS

CN    102171993 A    8/2011
CN    102594689 A    7/2012
(Continued)

OTHER PUBLICATIONS

Foreign Communication From A Counterpart Application, PCT Application No. PCT/CN2013/088107, International Search Report dated Feb. 20, 2014, 8 pages.
(Continued)

*Primary Examiner* — Mahran Abu Roumi
(74) *Attorney, Agent, or Firm* — Conley Rose, P.C.

(57) ABSTRACT

An OpenFlow (OF) adaptor comprising at least one OF port configured to communicate with an OF Controller, at least one Non-OF (NOF) port configured to communicate with a NOF switch, and at least one processor coupled to the OF port and the NOF port and configured to receive a first OF message comprising network data from the OF controller via the OF port, translate the first OF message into a first NOF message, wherein the first NOF message comprises network data analogous to the first OF message network data encoded in a format supported by the NOF switch, and transmit the first NOF message toward the NOF switch via the NOF port.

21 Claims, 15 Drawing Sheets

(51) Int. Cl.
*H04L 12/751* (2013.01)
*H04L 12/24* (2006.01)

(58) Field of Classification Search
CPC . H04L 45/00; H04L 29/0653; H04L 49/3009; H04L 47/10
USPC ........................................................ 709/223
See application file for complete search history.

(56) References Cited

U.S. PATENT DOCUMENTS

| | | | |
|---|---|---|---|
| 9,319,338 B2* | 4/2016 | Padmanabhan | G05B 11/01 |
| 2010/0257263 A1* | 10/2010 | Casado | H04L 49/00 709/223 |
| 2011/0317559 A1* | 12/2011 | Kern | H04L 45/02 370/235 |
| 2012/0044935 A1* | 2/2012 | Hama | H04L 12/4625 370/389 |
| 2012/0250496 A1* | 10/2012 | Kato | H04L 47/125 370/216 |
| 2013/0010605 A1* | 1/2013 | Jocha | H04L 43/026 370/241.1 |
| 2013/0058208 A1* | 3/2013 | Pfaff | H04L 12/4633 370/217 |
| 2013/0058229 A1* | 3/2013 | Casado | H04L 45/745 370/252 |
| 2013/0058351 A1* | 3/2013 | Casado | H04L 47/00 370/400 |
| 2013/0058354 A1* | 3/2013 | Casado | H04L 12/4633 370/401 |
| 2013/0103817 A1* | 4/2013 | Koponen | G06F 9/45558 709/223 |
| 2013/0117429 A1* | 5/2013 | Koponen | H04L 41/00 709/223 |
| 2013/0230047 A1* | 9/2013 | Subrahmaniam | H04L 47/2441 370/392 |
| 2013/0250770 A1* | 9/2013 | Zou | H04L 47/19 370/238 |
| 2013/0266007 A1* | 10/2013 | Kumbhare | H04L 45/56 370/389 |
| 2013/0287026 A1* | 10/2013 | Davie | H04L 49/70 370/392 |
| 2013/0315248 A1* | 11/2013 | Morimoto | H04L 12/4633 370/392 |
| 2013/0326045 A1 | 12/2013 | Wang et al. | |
| 2013/0329601 A1* | 12/2013 | Yin | H04L 45/02 370/254 |
| 2014/0193154 A1* | 7/2014 | Graham | H04L 67/28 398/79 |
| 2015/0023210 A1* | 1/2015 | Kis | H04L 45/563 370/254 |

FOREIGN PATENT DOCUMENTS

| | | | | |
|---|---|---|---|---|
| CN | 102685006 A | 9/2012 | | |
| SE | WO 2010041996 A1 * | 4/2010 | ............ | G06F 9/455 |
| WO | 2012101692 A1 | 8/2012 | | |

OTHER PUBLICATIONS

Foreign Communication From A Counterpart Application, PCT Application No. PCT/CN2013/088107, Written Opinion dated Feb. 20, 2014, 6 pages.
"OpenFlow Switch Specification," Version 1.3.0, Open Networking Foundation, Wire Protocol 0x04, Jun. 25, 2012, 106 pages.
"Reasearch and Implimentation of Routing Mechanism in Openflow Networks," Mar. 20, 2012, 70 pages.
English Translation of "Reasearch and Implimentation of Routing Mechanism in Openflow Networks," Apr. 21, 2017, 2 pages.
"OpenFlow Switch Specification," Version 1.3.1, (Wire Protocol 0x04), ONF TS-007, Sep. 6, 2012, 128 pages.
Foreign Communication From A Counterpart Application, Chinese Application No. 201380061704.3, Chinese Search Report dated Feb. 20, 2017, 2 pages.
Foreign Communication From A Counterpart Application, Chinese Application No. 201380061704.3, Chinese Office Action dated Mar. 1, 2017, 6 pages.

* cited by examiner

TRANSFORMATION AND UNIFIED CONTROL OF HYBRID NETWORKS COMPOSED OF OPENFLOW SWITCHES AND OTHER PROGRAMMABLE SWITCHES

CROSS-REFERENCE TO RELATED APPLICATIONS

The present application claims priority to U.S. Provisional Patent Application 61/731,391 filed Nov. 29, 2012 by Min Luo, et al., and entitled "Apparatus for Transformation and Unified Control of Hybrid Networks Composed of Open-Flow Switches and Other Programmable Switches," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Software Defined Network (SDN) may be a network where network elements (NEs) such as routers, switches, etc. may be configured and managed with software to enable the simplification of those hardware devices with mostly data forwarding functionality such that commodity computers can be used as NEs, replacing the traditionally expensive and underutilized NEs in the existing network. SDN reduces the need to manually configure and manage such hardware. SDN abstraction may comprise decoupling the NE's control plane from the its data plane, which may result in overall network simplification, virtualization, and the ability to implement remote and/or dynamic NE configuration. SDN decoupling may also allow the control plane and the data plane to operate on different hardware, in different runtime environments, and/or operate using different distribution models. SDN technologies may also support further development and deployment of cloud computing technologies.

SUMMARY

In one embodiment, the disclosure includes an OpenFlow (OF) adaptor comprising at least one OF port configured to communicate with an OF Controller, at least one Non-OpenFlow (NOF) port configured to communicate with a NOF switch, and at least one processor coupled to the OF port and the NOF port and configured to receive a first OF message comprising network data from the OF controller via the OF port, translate the first OF message into a first NOF message, wherein the first NOF message comprises network data analogous to the first OF message network data encoded in a format supported by the NOF switch, and transmit the first NOF message toward the NOF switch via the NOF port.

In another embodiment, the disclosure includes a computer program product for use by an OF adaptor positioned between an OF controller and a NOF NE, the computer program product comprising computer executable instructions stored on a non-transitory computer readable medium such that when executed by a processor cause the OF adaptor to translate an OF message into NOF format and then transmit the translated message to the NOF NE, receive a reply message from the NOF NE in NOF format, and translate the reply message to OF format.

In another embodiment, the disclosure includes a method implemented in an OF controller comprising discovering network topology in a hybrid network comprising OF enabled NEs and NOF enabled NEs, and storing the discovered hybrid network topology in a network information base (NIB).

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

SDN may operate in conjunction OF, which may be a standardized communication protocol that supports connectivity between a SDN control plane and a SDN data plane.

Openflow may allow an OF controller operating in the control plan to control OF NEs (e.g. an OF Switch) operating in the data plane (also known as the forwarding plane). OF may not be backwards compatible with NOF technology. Legacy systems may comprise significant numbers of NOF NEs (e.g. Programmable Switches) which may be costly to replace. Such NOF NEs may not be controlled by an OF controller and may not be compatible with OF NEs. NOF NEs may also comprise a wide variety of devices, and each type of NOF NE may communicate using different protocols. Based on the compatibility issues, NOF NEs and OF NEs may not operate in the same network.

Disclosed herein is an OF Adapter that may perform translation between Openflow messages and messages that a NOF NE (e.g. programmable switch) may support and/or understand, which may allow an OF controller to control a hybrid network comprising both OF NEs and NOF NEs. An OF Adaptor may translate Openflow messages received from an OF controller into messages that NOF NEs support, and then disseminate such messages to target NOF NEs. The OF Adaptor may also translate messages received from NOF NEs into standard Openflow messages, and then deliver such Openflow messages to the OF controller. The OF adapter may be logically centralized and may be deployed in a centralized and/or distributed fashion. For example, one or more OF adaptors may be located in one or more servers as an extension to the OF controller, or as an OF plugin to NOF NEs, which may cause the associated NOF NEs to behave like OF NEs. Message transformation, mapping, and/or services may be implemented through standards based Application Programming Interfaces (APIs), such as an OF API and a NOF API. The OF adapter may comprise an OFMessageParser to parse a message and determine whether such message is a standard Openflow message, an OF-NOFMessageTranslator which may translate between Openflow messages and Non-Openflow messages, a NOF-MessageParser which may parse a message and determine whether such complies with a format supported by a NOF NE, and/or an OF NOFMessageMapper which may store mapping relationships between Openflow messages and Non-Openflow messages.

Figure 1:
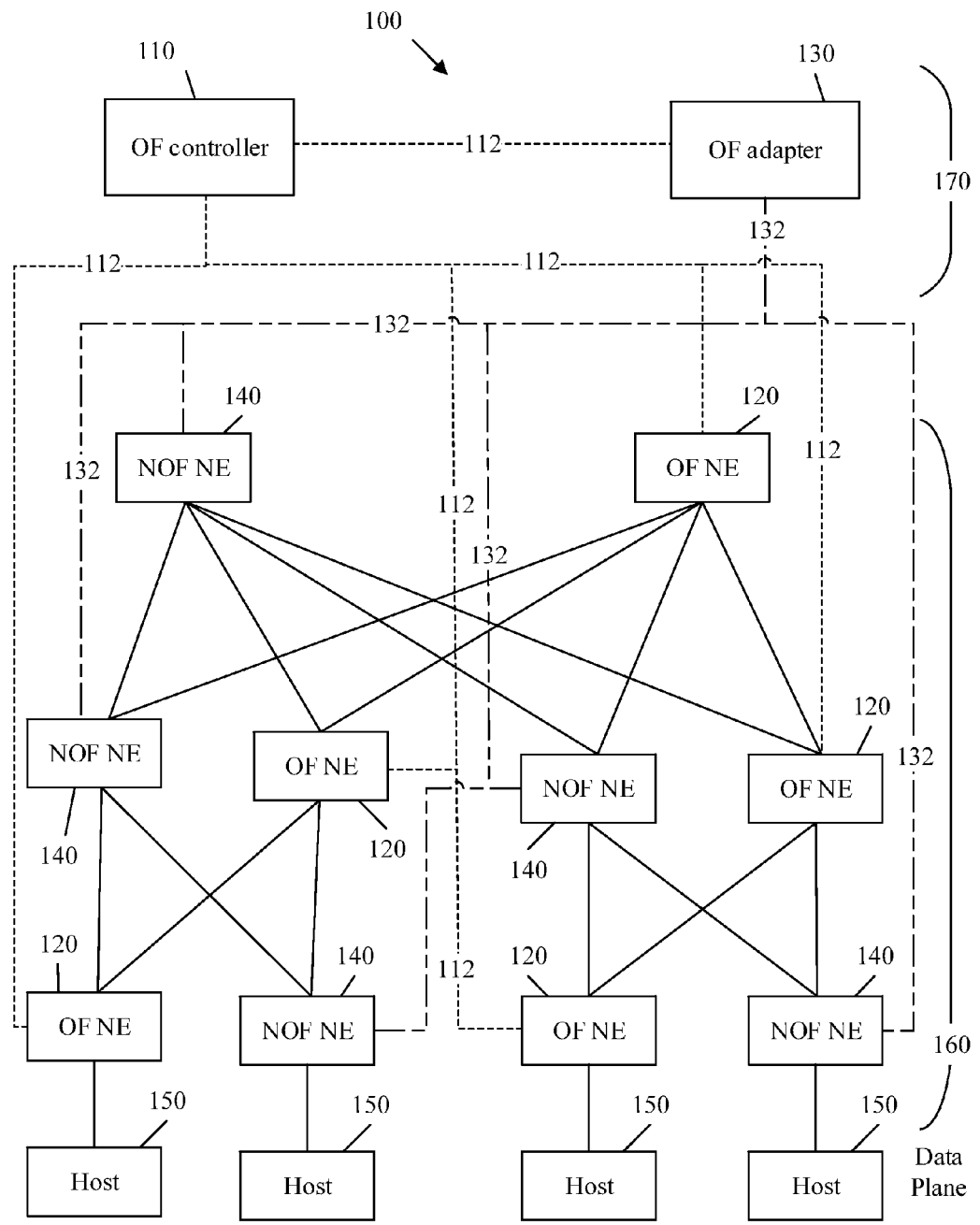
FIG. 1 is a schematic diagram of an embodiment of a hybrid programmable network architecture.

FIG. 1 is a schematic diagram of an embodiment of a hybrid programmable network 100 architecture. Network 100 may comprise a data plane 160, which may comprise a plurality of interconnected OF NEs 120 (e.g. programmable switches) and NOF NEs 140 (e.g. programmable switches). A plurality of hosts 150 may be interconnected by the data plane 160 NEs. The data plane 160 may be controlled by a control plane 170. The control plane 170 may comprise an OF controller 110 and an OF adaptor 130. The OF controller 110 may control OF NEs 120 via OF control channels 112. The OF controller 110 may control the NOF NEs 140 via the OF adaptor 130 and NOF control channel 132. The OF adaptor 130 may translate OF messages from the OF controller 110 into substantially equivalent control messages that are native to the NOF NEs 140 and vice versa.

An OF controller 110 may be any device configured to manage message (e.g. packet) routing in network 100. An OF controller 110 may maintain topology and resource utilization data associated with network 100. The OF controller 110 may maintain awareness of data plane 160 links connecting network 100 NEs (e.g. network topology), link resource utilization, node resource utilization (e.g. OF NEs 120 and/or NOF NEs 140), network 100 errors, data flow states, and any other data that may be employed to manage network 100. OF controller 110 may employ such topology and resource utilization data to dynamically route data flows through network 100 based on changing conditions in the network 100. For example, the OF controller 110 may change the behavior of network 100 to route data flows around equipment failures, load balance network NEs and/or links, optimize flow traffic based on specified constraints (e.g. latency, bandwidth, number of hops, etc.), and/or globally optimize network 100 traffic patterns. Specifically, the OF controller 110 may collect network 100 status information, make decisions on network 100 routing policy, generate flow entries, and/or disseminate such flow entries to network 100 NEs.

An OF NE 120 may be any NE (e.g. programmable network switch) configured to forward data flows through network 100 based on OF control messages from OF controller 110. Each OF NE 120 may comprise a flow table, which may comprise a plurality of flow entries. Each flow table entry may indicate a desired response upon receiving a packet associated with a particular flow. For example, flow entry may direct the OF NE 120 to forward the packet over a specified interface, drop the packet, modify the packet, etc. When a packet is received that is not represented in the flow table, the OF NE 120 may forward the packet to the OF controller 110 over an OF control channel 112. The OF controller 110 may review the packet and respond with instructions. The OF NE 120 may manage the packet accordingly and add an associated entry to the flow table so that future related packets (e.g. that are part of the same flow) may be managed locally. Each OF NE 120 may be connected to the OF controller 110 by a dedicated OF control channel 112 for high speed flow table updates.

A NOF NE 140 may be any programmable NE (e.g. programmable network switch) that may forward data packets through network 100 and may not be compatible with the Openflow protocol. A NOF NE 140 may encompass a wide variety of NEs, such as Media Access Control (MAC) based Open Systems Interconnect (OSI) model layer two switches (e.g. Ethernet switches), Virtual Local Area Network (VLAN) switches, Internet Protocol (IP) based OSI model layer three switches, Wireless Local Area Network (WLAN) routers, optical switches such as wave division multiplexing (WDM), time division multiplexing (TDM) routers, Multi-Protocol Label Switching (MPLS) and/or Generalized MultiProtocol Label Switching (GMPLS) switches, and/or any other programmable NEs that are not natively compatible with an Openflow protocol. For example, a NOF NE 140 may comprise a routing table and may be coupled to NOF control channel 132. Such a NOF NE 140 may forward packets based on the routing table and may accept commands to change the routing table via control channel 132. A NOF NE 140 with a routing table may be programmable, but may not be directly compatible with Openflow. For example, such a NE may forward packets based purely on packet address and not based on the flow to which the packet is related.

OF adapter 130 may be any device configured to convert Openflow messages received on an OF controller 110 facing interface and transmit an associated message on a NOF NE 140 facing interface, based on the NOF NE 140 type, and vice versa. For example, an OF adapter 130 may be configured as a plugin to a single NOF NE 140 and may cause the NE to act like an OF NE from the perspective of the OF controller 110. As another example, the OF adaptor 130 may be logically centralized with a plurality of NOF NE 140 facing interfaces. The OF adaptor 130 may support a plurality of NOF NEs 140 of the same or differing types (e.g. layer two, layer three, optical, etc.). The OF adaptor 130 may allow the OF controller 110 to control a hybrid network 100 of devices that are natively incompatible. The OF adaptor 130 may support Openflow data plane 170 control over a preinstalled network and may also support the combination of preexisting incompatible networks by implementing an overarching Openflow control. For example, a data center may comprise a plurality of preexisting incompatible networks (e.g. WDM and Ethernet) deployed in a parallel fashion and managed separately. A centralized OF adaptor 130 may allow an OF controller 110 to simultaneously manage both networks, which may allow for cross network optimization.

Host 150 may be any device configured to transmit and receive data packets across the data plane 160. For example, a first host 150 may connect to an OF NE 120 and/or a NOF NE 140 via a wired and/or wireless connection and may communicate with a second host 150 and/or the Internet via the data plane 160. A host 150 may, for example, comprise a personal computer (PC), laptop PC, tablet PC, smart phone with internet connectivity, Voice Over IP (VOIP) device, and/or other end user device. The communications for a host 150 across hybrid network 100 may be managed by the OF controller 110. For example, a host 150 may transmit a message to an OF NE 120 as part of a new data flow. The OF NE 120 may not have a data flow table entry associated with the flow and may query the OF controller 110 via OF control channel 112. The OF controller may determine a route for the flow across network 100 and may transmit instructions to the OF NE 120 to create an associated flow table entry. The OF NE 120 may transmit the packet to a NOF NE 140 based on the instructions of the OF controller 110. The NOF NE 140 may, for example, comprise a routing table. The NOF NE 140 may not have a routing table entry for the host 150. The NOF NE 140 may transmit a request to OF controller 110 via OF adaptor 130 for a routing table update. The request may be of a type native to the NOF NE 140 and may be deployment specific (e.g. based on an interior gateway protocol such as Open Shortest Path First-Traffic Engineering (OSPF-TE)). The OF adaptor 130 may receive the update request, convert the request to an Openflow request, and forward the Openflow request to the OF controller 110. The OF controller 110 may transmit a reply indicating to the NOF NE 140 a routing for the flow. The OF adaptor 130 may convert the reply from a flow based instruction to an address based instruction that may be understood by the NOF NE 140. The NOF NE 140 may update its routing table and forward the packet accordingly.

It should be noted that data plane 160 connections are illustrated in solid lines between NEs, OF control channels 112 are illustrated with dotted lines, and NOF control channels 132 are illustrated in dashed lines. The distinctions between the lines may be based on logical differences between the use for the lines, for example to forward data, control OF NEs 120, and control NOF NEs 140, respectively. The links of data plane 160, control channel 112, and control channel 132 may comprise the same or different components and/or materials (e.g. optical transmission components and/or links versus electrical transmission components and/or links) and may be physical links, virtual abstractions of physical links, and/or any combination thereof. It should also be noted that OF control channels 112 and NOF control channels 132 may be considered part of the control plane 170 from a logical perspective.

Figure 2:
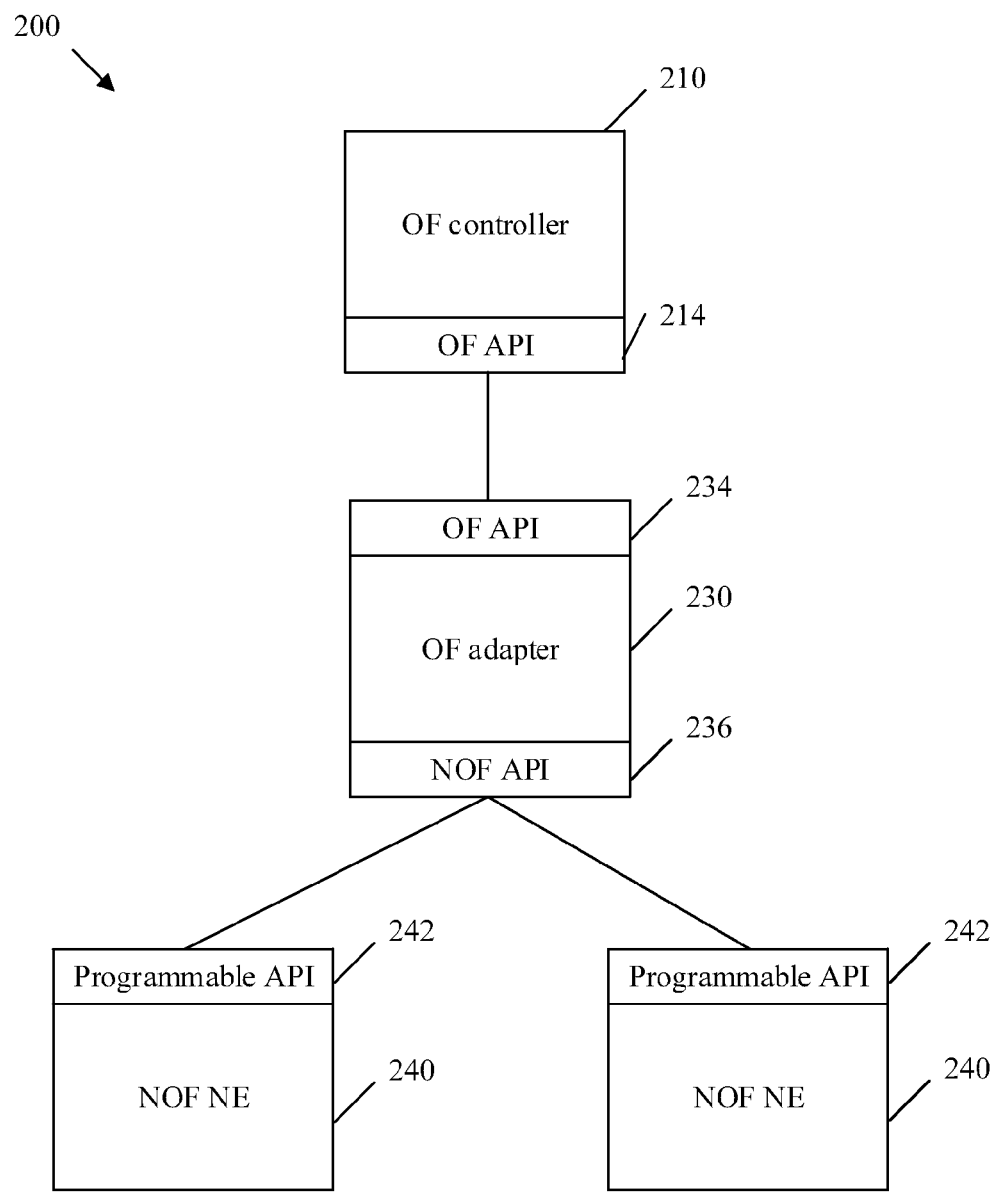
FIG. 2 is a schematic diagram of another embodiment of a hybrid programmable network architecture.

FIG. 2 is a schematic diagram of another embodiment of a hybrid programmable network 200 architecture. For example, network 200 may comprise a partial embodiment of network 100. Network 200 may comprise an OF controller 210, an OF adaptor 230, and a plurality of NOF NEs 240, which may be substantially similar to OF controller 110, an OF adaptor 130, and NOF NEs 140, respectively. OF adaptor 230 may be centralized and may be positioned between OF controller 210 and NOF NEs 240. OF adaptor 230 may comprise an OF API 234 on an OF controller 210 facing interface. OF controller 210 may comprise an OF API 214 that corresponds to the OF API 234. OF APIs 214 and 234 may comprise standard Openflow programmable communication interfaces, such as function libraries, configured to interpret Openflow protocol messages. OF adaptor 230 may be configured to interact with OF controller 210 using APIs 234 and 214. For example, OF adaptor 230 may use API 234 to encode function calls and/or other data into an Openflow format message and transmit the message to OF controller 210. OF controller 210 may employ OF API 214 to decode the Openflow message and employ functions as specified by the OF API 214. Likewise, OF controller 210 may employ OF API 214 to encode messages for OF adaptor 230 and OF adaptor 230 may decode such messages using OF API 234.

OF adaptor 230 may further comprise one or more NOF APIs 236 on a plurality of NOF NE 240 facing interfaces. NOF NEs 240 may each comprise a programmable API 242 that corresponds to NOF API 236. Programmable APIs 242 may each comprise programmable communication interfaces, such as libraries, that may interpret messages native to the NOF NEs 240. OF adaptor 230 may be configured to communicate with NOF NEs 240 using NOF API 236 and Programmable APIs 242 by encoding and decoding messages in a manner similar to OF APIs 214 and 234. Programmable APIs 242 may be specific to NOF NEs 240 and may comprise legacy libraries and/or functions. OF adaptor's NOF API 236 may be configured to interact with a specific NOF NE 240 and/or type of NOF NE 240. In the case where NOF NEs 240 each comprise a different programmable API 242, OF adaptor 230 may comprise a different NOF API 236 for each NOF NE 240. OF API 234 and/or NOF API 236 may be updated and/or reconfigured as needed to support different OF controllers 210 and different NOF NEs 240 as network 200 deployment changes over time, for example due to new NEs being added and/or legacy NEs being removed from the network 200. By employing OF API 234 and NOF API 236, OF adaptor 230 may communicate with OF controller 210 in Openflow, NOF NEs 240 in a protocol native to the NOF NEs 240, and may convert messages received on OF API 234 to messages usable by NOF API 236 and vice versa.

Figure 3:
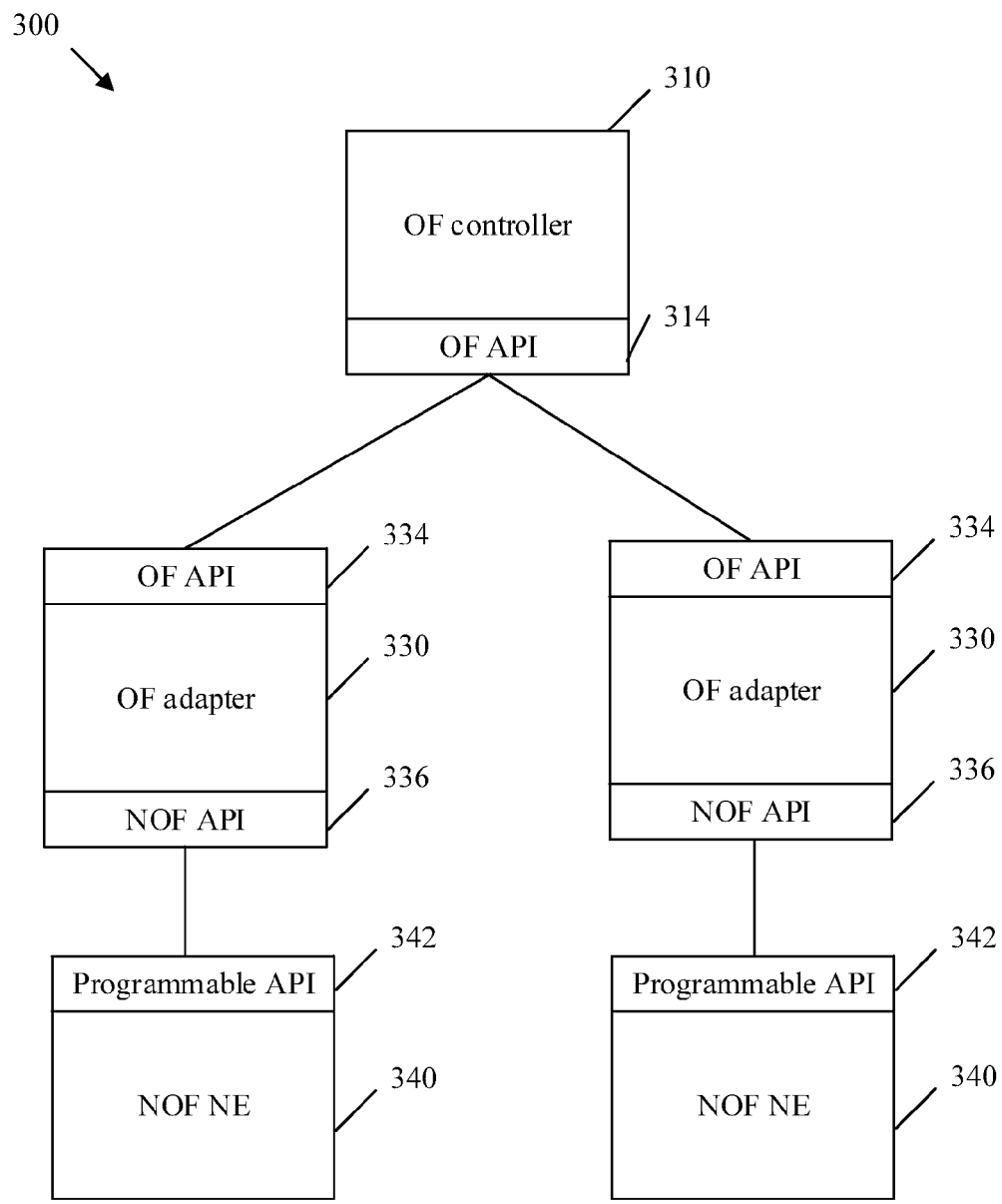
FIG. 3 is a schematic diagram of another embodiment of a hybrid programmable network architecture.

FIG. 3 is a schematic diagram of another embodiment of a hybrid programmable network 300 architecture. Network 300 may comprise an OF controller 310 with an OF API 314, OF adaptors 330 with OF APIs 334 and NOF APIs 336, and NOF NEs 340 with programmable APIs 342, which may be substantially similar to OF controller 210, OF API 214, OF adaptor 230, OF API 234, NOF API 236, NOF NEs 240, and programmable APIs 242, respectively. In contrast to network 200, the OF adaptors 330 may not be logically centralized and may act as plug-ins to the NOF NEs 340. OF adaptors 330 may cause each NOF NE 340 to act like an OF NE from the point of view of the OF controller 310. OF adaptors 330 may also be less complex and cheaper to manufacture than OF adaptor 230, as OF adaptors 330 may be designed to work with a specific type of NOF NE 340 instead of being designed to interact with a large cross section of potential NOF NE 340 types as may be required by a centralized positioning.

Figure 4:
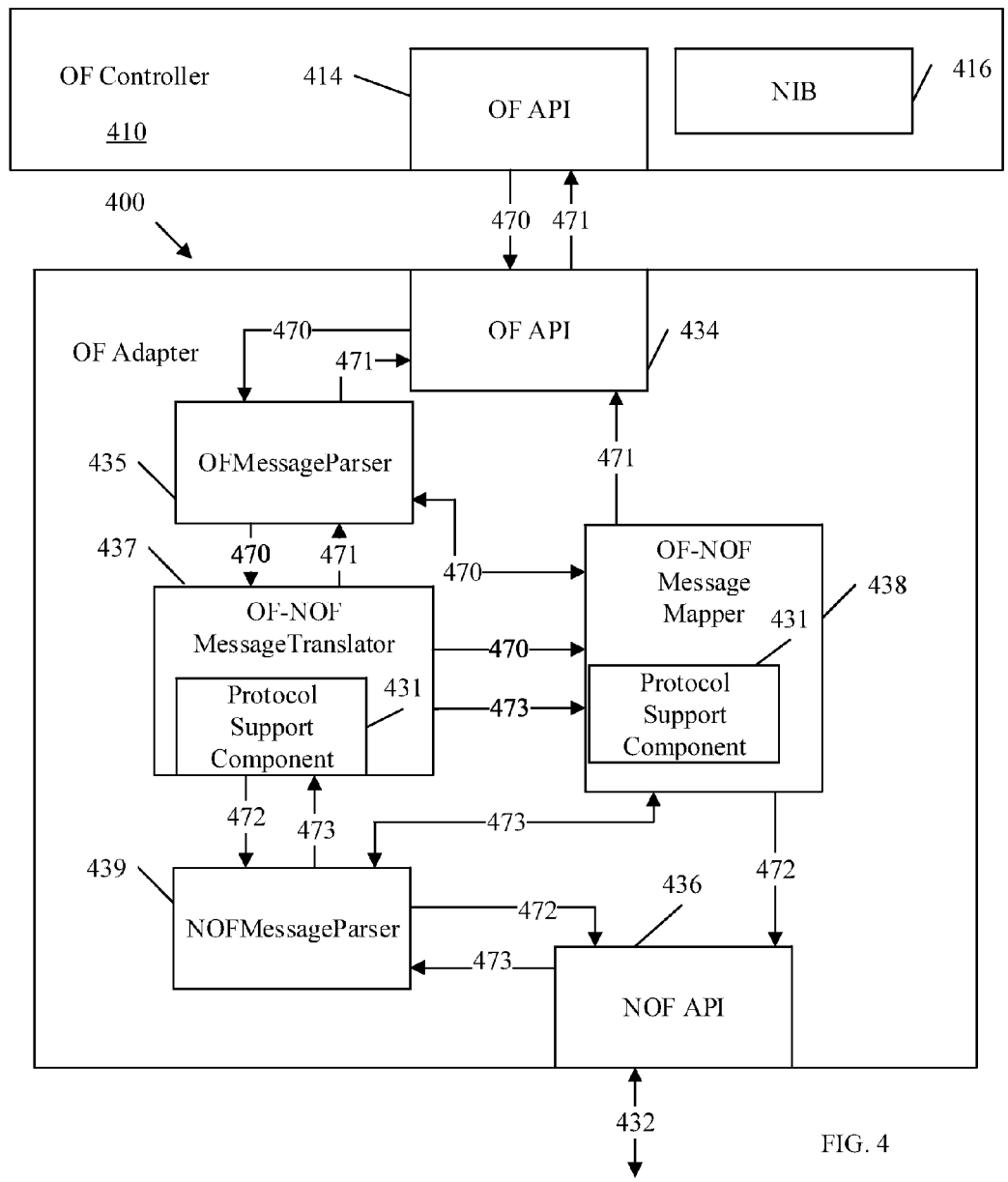
FIG. 4 is a schematic diagram of an embodiment of an OF adaptor.

FIG. 4 is a schematic diagram of an embodiment of an OF adaptor 400, which may be similar to OF adaptor 130, 230, and/or 330. OF adaptor 400 may be configured to communicate with an OF controller 410, which may be substantially similar to OF controller 110, 210, and/or 310. OF controller 410 may comprise an OF API 414, which may be substantially similar to OF API 214 and/or 314, and a Network Information Base (NIB) 416 which may comprise topology and/or network flow data used for controlling a network such as network 100, 200, and/or 300. OF adaptor 400 may comprise an OF API 434 and NOF API 436, which may be substantially similar to OF APIs 234 and/or 334 and NOF APIs 236 and/or 336, respectively. OF adaptor 400 may further comprise an OFMessageParser 435, an OF-NOFMessageTranslator 437, an OF-NOFMessageMapper 438, and a NOFMessage Parser 439, which may be connected as shown in FIG. 4.

OF API 434 may receive an OF message 470 from OF API 414. OF API 434 may obtain function calls, variables, etc., invoked by OF message 470 and may forward the message 470 along with any associated API data to OFMessageParser 435. OFMessageParser 435 may be a component and/or routine configured to parse OF messages such as OF message 470. OFMessageParser 435 may respond (e.g. to OF API 434) with error(s) when message 470 is not a proper Openflow message. OFMessageParser 435 may also create a data structure(s) based on the content of OF message 470 in light of the associated API data included by the OF API 434. The OFMessageParser 435 may forward the data structure of the OF message 470 to the OF-NOFMessageTranslator 437 and/or the OF-NOFMessageMapper 438.

The OF-NOFMessageTranslator 437 may be a component and/or process configured to translate OF data structures into analogous NOF data structures, and vice versa. For example, the OF-NOFMessageTranslator 437 may accept an OF message data structure directing a NOF NE to create a flow entry to forward a specified flow from a first port to a second port. The translate OF data structures into analogous NOF data structures, and vice versa. For example, the OF-NOFMessageTranslator 437 may convert such a data structure to direct the NOF NE to update a routing table to indicate messages with a specified MAC address (e.g. associated with the flow) received from the first port should be forwarded to the second port. It should be noted that translation may comprise translating between OF and NOF message types, translating addressing schemes, or combinations thereof. The translation process of OF-NOFMessageTranslator 437 may be case specific based on the type of NOF NE that is expected to receive the translated message. OF-NOFMessageTranslator 437 may be configured to translate to a single type of NOF NE messages in cases where the OF adaptor 400 is configured as a NOF NE plugin. OF-NOF-MessageTranslator 437 may also be configured to translate into a broad range of NOF NE message types in cases where the OF adaptor 400 is centralized and/or designed as a standard component to be employed in a broad range of networks. The OF data structure associated with message 470 may be translated by OF-NOFMessageTranslator 437 into a NOF data structure associated with NOF message 472. The OF-NOFMessageTranslator 437 may forward NOF message 472 to NOFMessageParser 439. The translation of OF message 470 into NOF message 472 may result in a mapping from message 470 into message 472. The message 470 mapping may be forwarded to OF-NOFMessageMapper 438.

OF-NOFMessageMapper 438 may be an optional component employed to increase the processing speed of OF adaptor 400. OF-NOFMessageMapper 438 may be any component and/or process configured to store OF-NOF message mappings (e.g. from OF-NOFMessageTranslator 437) and perform message translations based on such mappings. For example, OFMessageParser 435 may forward OF message 470 to OF-NOFMessageMapper 438 upon receipt. If the OF-NOFMessageMapper 438 comprises a mapping that may be used to translate message 470, the OF-NOF-MessageMapper 438 may convert the OF message 470 into NOF message 472 without requiring translation by the OF-NOFMessageTranslator 437, which may reduce the overall load on NOFMessageTranslator 437 when similar messages are repeatedly transmitted across OF adaptor 400. If a mapping exists, the OF message 470 may be converted into NOF message 472 and may be forwarded to NOF API 436. In another embodiment, NOF message 472 may be forwarded to NOF API 436 via NOFMessageParser 439. If no mapping exists, OF message 470 may be returned to OFMessageParser 435 for translation by OF-NOFMessageTranslator 437. For example, the OF-NOFMessageTranslator 437 may receive an OF message 470, process the OF message 470, and encode NOF message 472 based on the data contained in OF message 470. In contrast, OF-NOFMessageMapper 438 may receive an OF message 470, obtain an associated mapping, drop the OF message 470, and send the stored NOF message 472 without processing OF message 470, which may significantly reduce load on the processor.

The OF-NOFMessageTranslator 437 and/or the NOF MessageMapper 438 may comprise a protocol support component 431. The protocol support component 431 may be a programmable module that may be configured to with all commands and/or other protocol data that may be accepted by and/or transmitted from the NOF NE. For example, the protocol support component 431 may comprise a function library. The protocol support component 431 may also comprise a listing of OF functions that are associated with the NOF NE protocol data. The OF-NOFMessageTranslator 437 and/or the NOF MessageMapper 438 may employ the protocol support component 431 to recognize and translate between OF and NOF messages, so that the OF components and NOF components may effectively exchange mutually understandable messages. The protocol support component 431 may be updateable via software upgrades, which may allow the OF-NOFMessageTranslator 437 and/or the NOF MessageMapper 438 to be upgraded to support wider varieties of NOF NEs based on the needs of a particular system.

NOFMessageParser 439 may be substantially similar to OFMessageParser 435, but may be configured to parse NOF messages associated with a specified type of NOF NE. For example, the NOFMessageParser 439 may receive the converted NOF message 472 data structure and may parse the message 472 to ensure that the message is in an acceptable NOF format. NOFMessageParser 439 may forward the NOF message 472 to the NOF API 436. NOF API 436 may be substantially similar to OF API 434, but may be configured to invoke any functions, variable, etc., understood by the NOF NE. NOF API 436 may communicate NOF message 472 with the NOF NE (e.g. NOF NE 140, 240, and/or 340) over NOF control channel 432, such as NOF control channel 132. The NOF API 436 may communicate with the NOF NE via a programmable API, such as API 242 and/or 342.

OF Adaptor 400 may also translate NOF messages received from a NOF NE into Openflow format and forward such messages to OF controller 410 via OF API 414. NOF API 436 may receive a NOF message 473 via NOF control channel 432. NOF message 473 may be forwarded to NOFMessageParser 439 along with any API data. NOFMessageParser 439 may reject the NOF message 473 if message 473 is not a proper NOF message. When message 473 is proper, NOFMessageParser 439 may forward NOF message 473 to OF-NOFMessageMapper 438 for potential conversion into OF message 471 if an associated mapping exists. If a mapping exists, NOF message 473 may be converted to OF message 471 and forwarded to the OF API 434 and/or the OFMessageParser 435 without passing through the OF-NOFMessageTranslator 437. If no mapping exists, the NOF message 473 data structure is forwarded from the NOFMessageParser 439 to the OF-NOFMessageTranslator 437 for translation into OF message 471. A mapping associated with NOF message 473 may be stored in the OF-NOFMessageMapper 438 for future conversions. OF message 471 data structure may be forwarded to OFMessageParser 435 for parsing and/or conversion into an associated OF message 471. OF message 471 may then be communicated by the OF API 434 to OF controller 410 via OF API 414.

Figure 5:
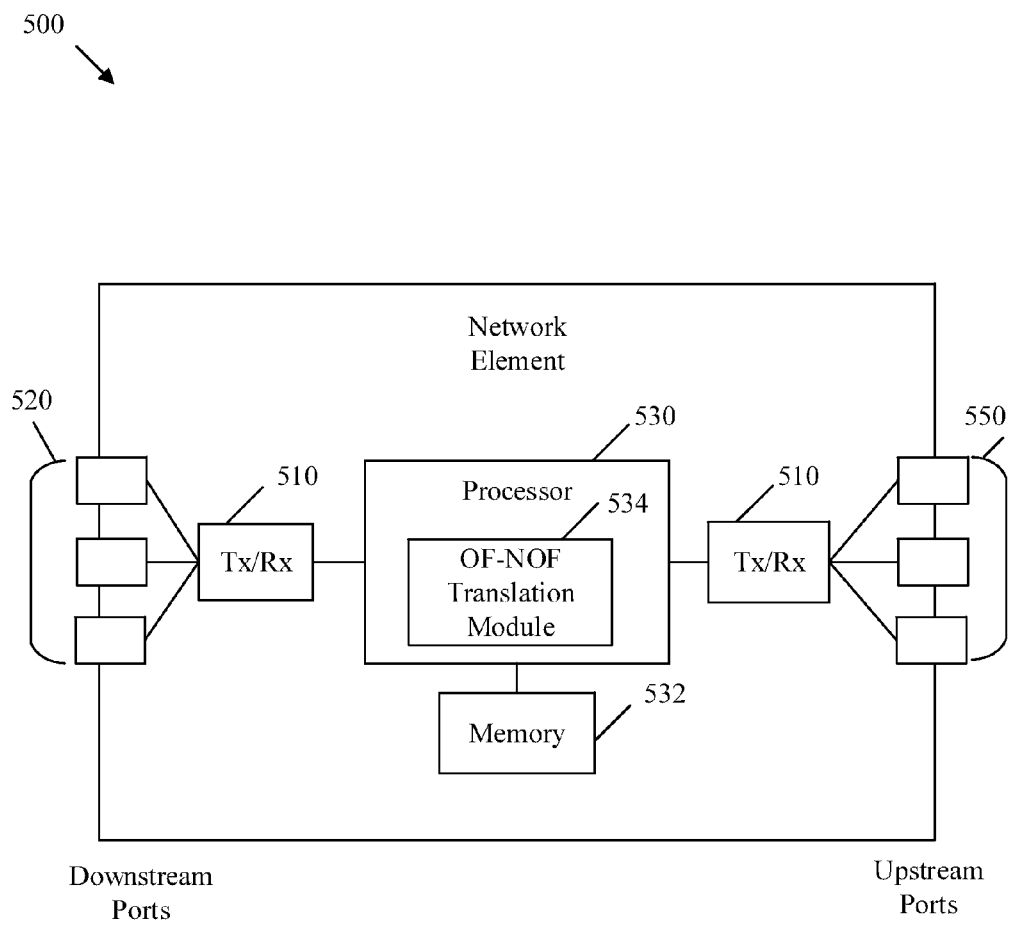
FIG. 5 is a schematic diagram of an embodiment of a NE within an OF adaptor.

FIG. 5 is a schematic diagram of an embodiment of a NE 500 within an OF adaptor such as OF adaptor 130, 230, 330, and/or 400. NE 500 may be configured to translate OF messages into NOF messages to support OF controller control of NOF NEs. NE 500 may be implemented in a single node or the functionality of NE 500 may be implemented in a plurality of nodes. In some embodiments, NE 500 may also act as other node(s) in network 100, 200, and/or 300, such as OF controller 110, 210, and/or 310, OF NE 120, and/or NOF NE 140, 240, and/or 340. NE 500 may also act as an OF controller 410. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure may be implemented in a network apparatus or component such as a NE 500. For instance, the features/methods in the disclosure may be implemented using hardware, firmware, and/or software installed to run on hardware. The NE 500 may be any device that transports frames through a network, e.g., a switch, router, bridge, server, a client, etc. As shown in FIG. 5, the NE 500 may comprise transceivers (Tx/Rx) 510, which may be transmitters, receivers, or combinations thereof. A Tx/Rx 510 may be coupled to a plurality of downstream ports 520 (e.g. downstream interfaces) for transmitting and/or receiving frames from other nodes and a Tx/Rx 510 coupled to a plurality of upstream ports 550 (e.g. upstream interfaces) for transmitting and/or receiving frames from other nodes, respectively. A processor 530 may be coupled to the Tx/Rxs 510 to process the frames and/or determine which nodes to send frames to. The processor 530 may comprise one or more multi-core processors and/or memory devices 532, which may function as data stores, buffers, etc. Processor 530 may be implemented as a general processor or may be part of one or more application specific integrated circuits (ASICs) and/or digital signal processors (DSPs). Processor 530 may comprise an OF-NOF Translation module 534, which may comprise an OF API 434, OFMessageParser 435, NOF API 436, OF-NOFMessageTranslator 437, OF-NOFMessageMapper 438, and/or NOFMessageParser 439, and may translate OF messages into NOF messages and vice versa. In an alternative embodiment, the OF-NOF Translation module 534 may be implemented as instructions stored in memory 532, which may be executed by processor 530, or implemented in part in the processor 530 and in part in the memory 532. In another alternative embodiment, the OF-NOF Translation module 534 may be implemented on separate NEs. The downstream ports 520 and/or upstream ports 550 may contain electrical and/or optical transmitting and/or receiving components.

It is understood that by programming and/or loading executable instructions onto the NE 500, at least one of the processor 530, OF-NOF Translation module 534, Tx/Rxs 510, memory 532, downstream ports 520, and/or upstream ports 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 6:
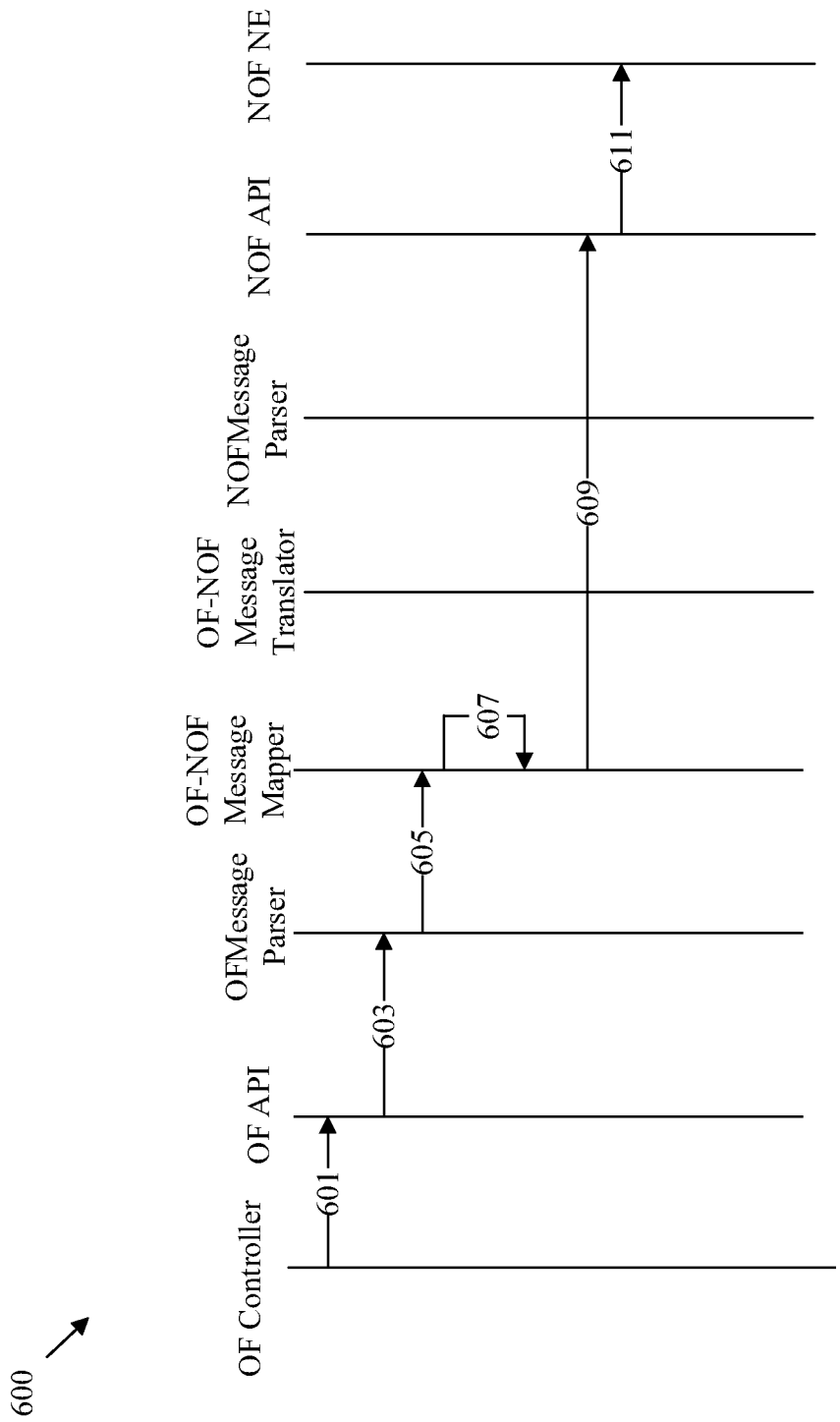
FIG. 6 is a protocol diagram of an embodiment of a method of OF to NOF translation.

FIG. 6 is a protocol diagram of an embodiment of a method 600 of OF to NOF translation, which may be implemented by an OF adaptor, such as OF adaptor 130, 230, 330, and/or 400. At step 601, an OF controller may send an OF message to an OF API. The OF API may forward the OF message to an OFMessageParser at step 603. At step 605, the OFMessageParser may parse the OF message and may query an OF-NOFMessageMapper to determine if a mapping relationship associated with the OF message exists. At step 607, the OF-NOFMessageMapper may determine a mapping associated with the OF message exists, for example in memory associated with the OF-NOFMessageMapper. At step 609, the OF-NOFMessageMapper may determine that the mapping already exists, may convert the OF message to a NOF message based on the mapping, and may send the NOF message directly to a NOF API. At step 611, the NOF API may forward the NOF message to an associated NOF NE.

Figure 7:
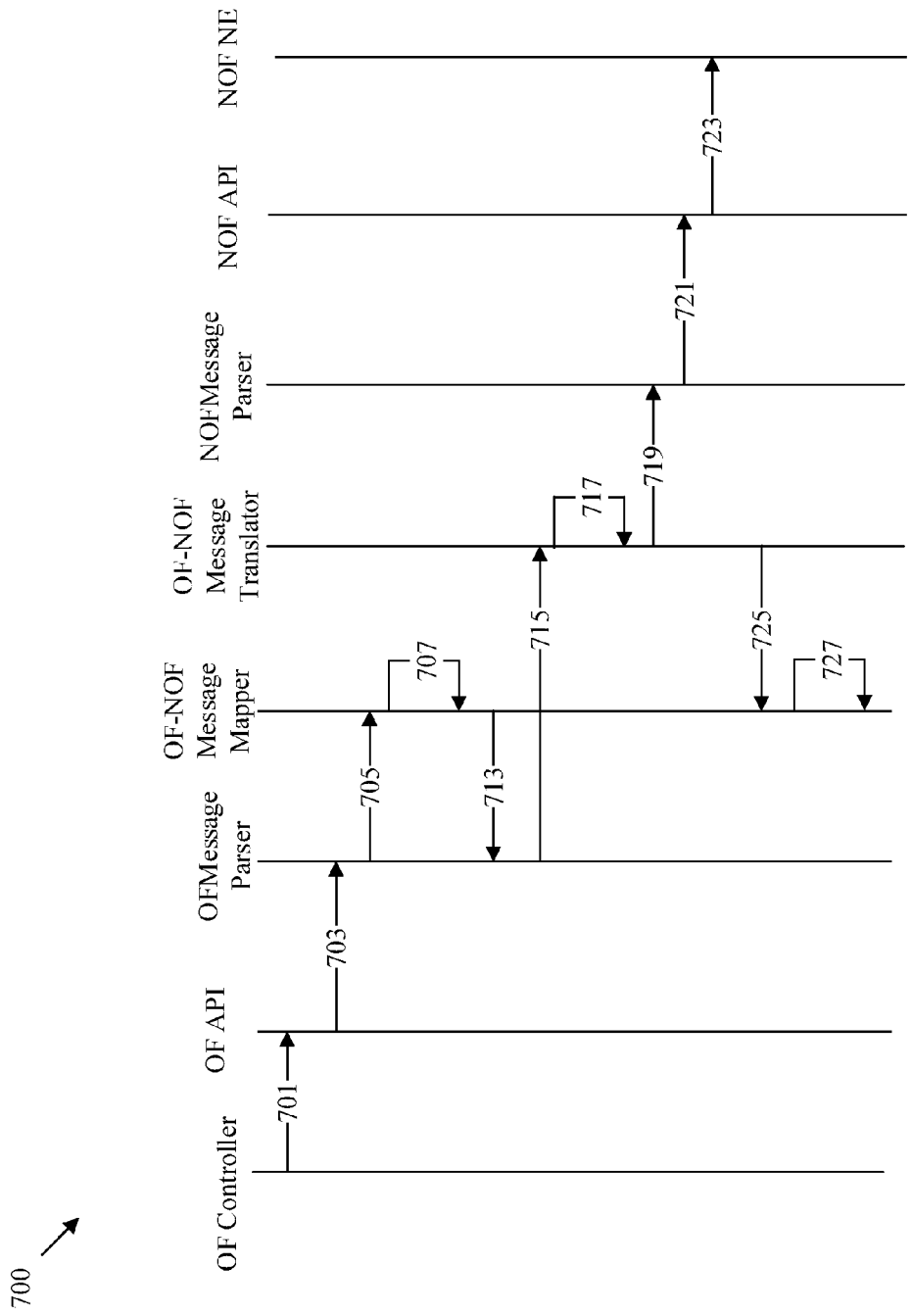
FIG. 7 is a protocol diagram of another embodiment of a method of OF to NOF translation.

FIG. 7 is a protocol diagram of another embodiment of a method 700 of OF to NOF translation, which may be implemented by an OF adaptor, such as OF adaptor 130, 230, 330, and/or 400. Method 700 may comprise steps 701, 703, 705, and 707, which may be substantially similar to steps 601, 603, 605, and 607. However, at step 707, the OF-NOFMessageMapper may determine that a mapping does not exist. At step 713, the OF-NOFMessageMapper may notify the OFMessageParser that no mapping exists. At step 715, the OFMessageParser may send a command to an OF-NOFMessageTranslator to translate the OF message into a NOF message. At step 717, the OF-NOFMessageTranslator may translate the OF message into the NOF message. At step 719, the OF-NOFMessageTranslator may send the NOF message to a NOFMessageParser. At step 721, the NOFMessageParser may send the NOF message to a NOF API. At step 723, the NOF API may send the NOF message to a NOF NE. At step 725, the OF-NOFMessageTranslator may notify the OF-NOFMessageMapper of a mapping relationship based on the translation of step 717. At step 727, the OF-NOFMessageMapper may store the mapping relationship of step 717 for future use, such as at step 607 of method 600. It should be noted that OF-NOFMessageTranslator may perform step 719 and step 725 in either order and that step 727 may be performed substantially simultaneously with steps 721 and 723.

Figure 8:
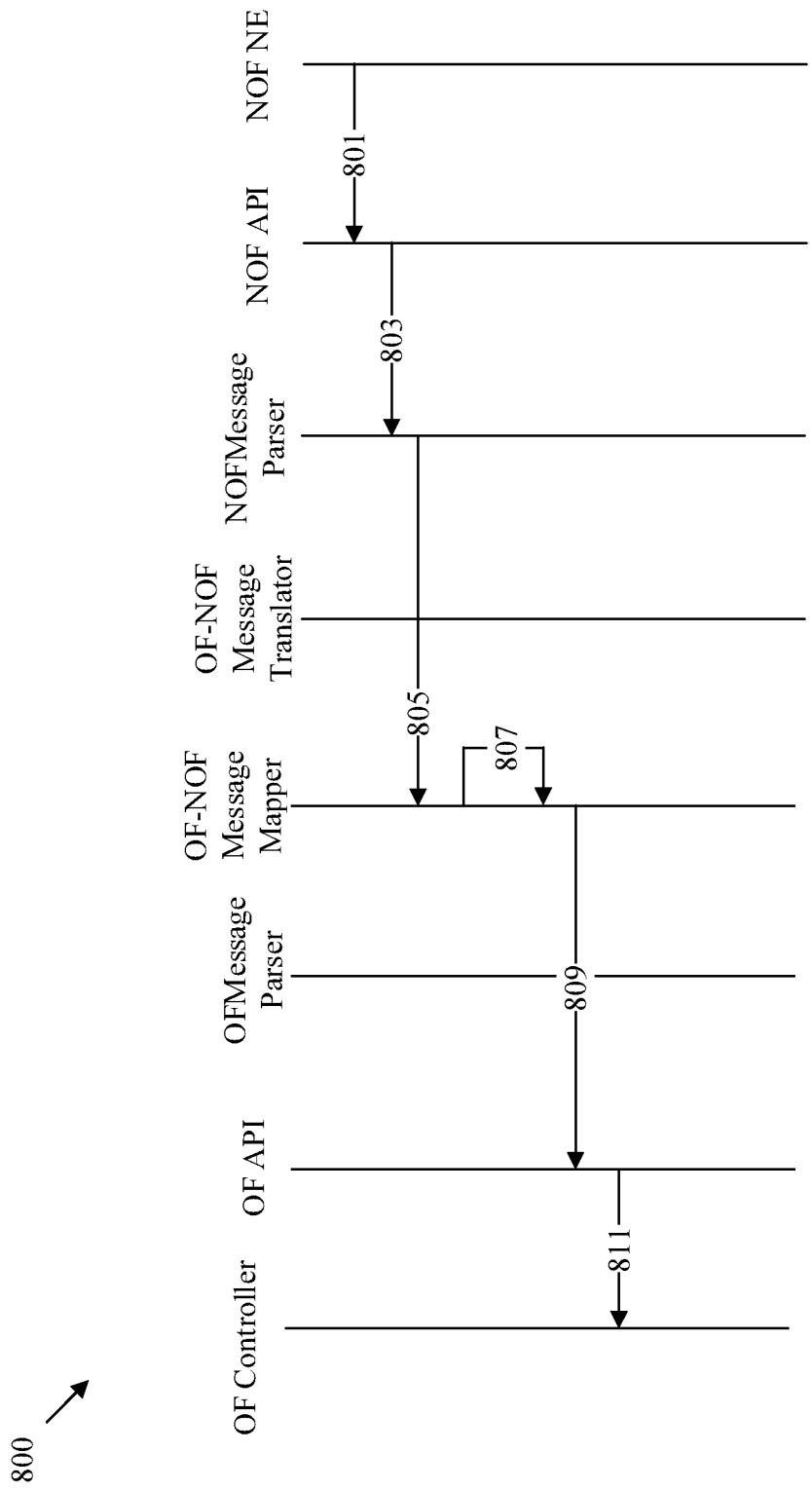
FIG. 8 is a protocol diagram of an embodiment of a method of NOF to OF translation.

FIG. 8 is a protocol diagram of an embodiment of a method 800 of NOF to OF translation, which may be implemented by an OF adaptor, such as OF adaptor 130, 230, 330, 400, and/or 500. Method 800 may be substantially similar to method 600, but may translate a NOF message into an OF message in contrast to the OF to NOF case of method 600. At step 801, a NOF NE may send a NOF message to a NOF API. The NOF API may forward the NOF message to a NOFMessageParser at step 803. At step 805, the NOFMessageParser may parse the NOF message and may query an OF-NOFMessageMapper to determine if a mapping relationship associated with the NOF message exists. At step 807, the OF-NOFMessageMapper may determine whether a mapping associated with the NOF message exists, for example, by querying memory associated with the OF-NOFMessageMapper. At step 809, the OF-NOFMessageMapper may convert the NOF message to an OF message based on the mapping, and may send the OF message directly to an OF API. At step 811, the OF API may forward the OF message to an OF controller.

Figure 9:
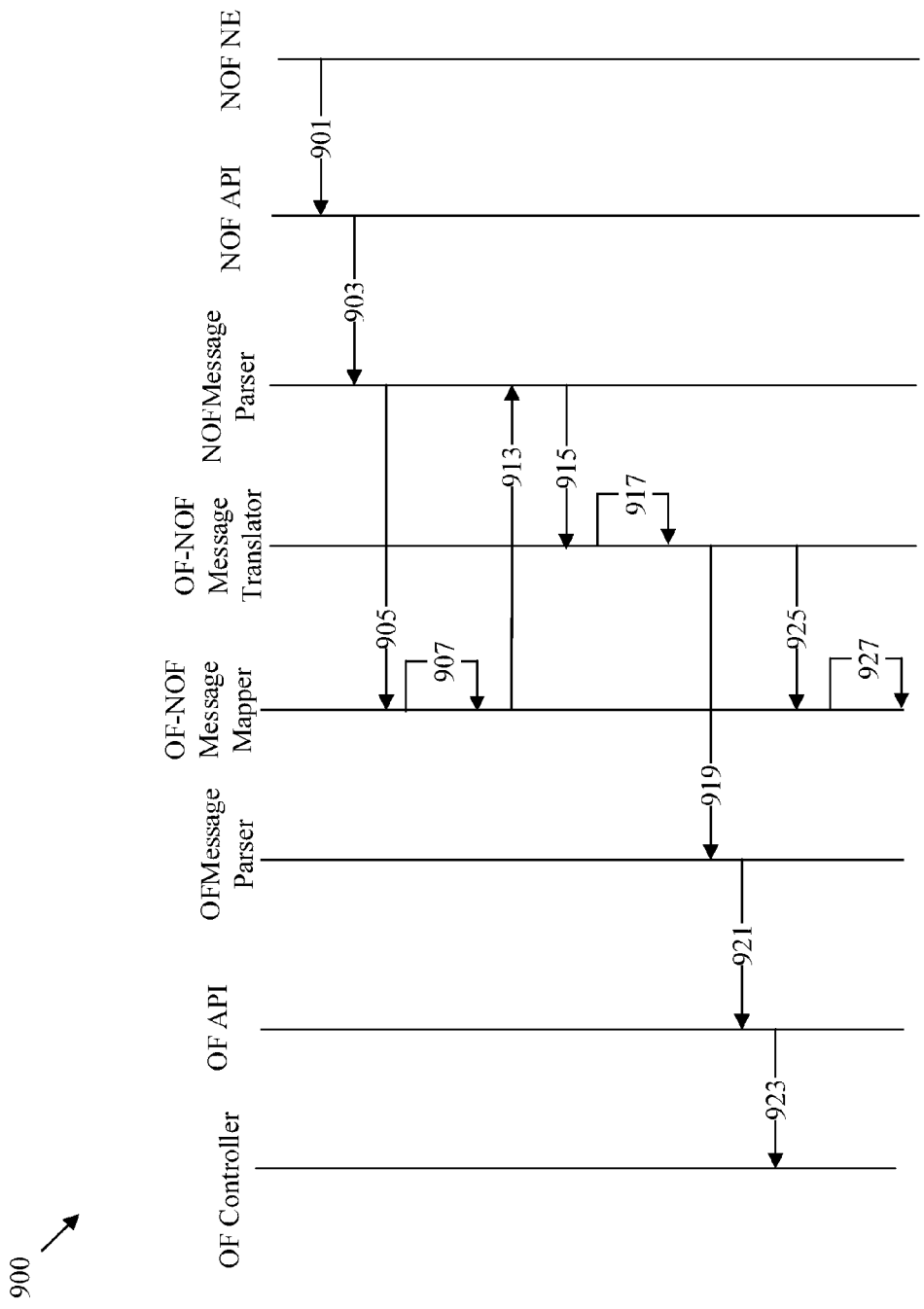
FIG. 9 is a protocol diagram of another embodiment of a method of NOF to OF translation.

FIG. 9 is a protocol diagram of another embodiment of a method of NOF to OF translation, which may be implemented by an OF adaptor, such as OF adaptor 130, 230, 330, and/or 400. Method 900 may be substantially similar to method 700, but may translate a NOF message into an OF message in contrast to the OF to NOF case of method 700. Method 900 may comprise steps 901, 903, 905, and 907, which may be substantially similar to steps 801, 803, 805, and 807. However, at step 907, the OF-NOFMessageMapper may determine that a mapping does not exist. At step 913, the OF-NOFMessageMapper may notify the NOFMessageParser that no mapping exists. At step 915, the NOFMessageParser may send a command to an OF-NOFMessageTranslator to translate the NOF message into an OF message. At step 917, the OF-NOFMessageTranslator may translate the NOF message into the OF message. At step 919, the OF-NOFMessageTranslator may send the OF message to an OFMessageParser. At step 921, the OFMessageParser may send the OF message to an OF API. At step 923, the OF API may send the OF message to an OF controller. At step 925, the OF-NOFMessageTranslator may notify the OF-NOFMessageMapper of a mapping relationship based on the translation of step 917. At step 927, the OF-NOFMessageMapper may store the mapping relationship of step 917 for future use, such as at step 807 of method 800. It should be noted that OF-NOFMessageTranslator may perform step 919 and step 925 in either order and that step 927 may be performed substantially simultaneously with steps 921 and 923.

Figure 10:
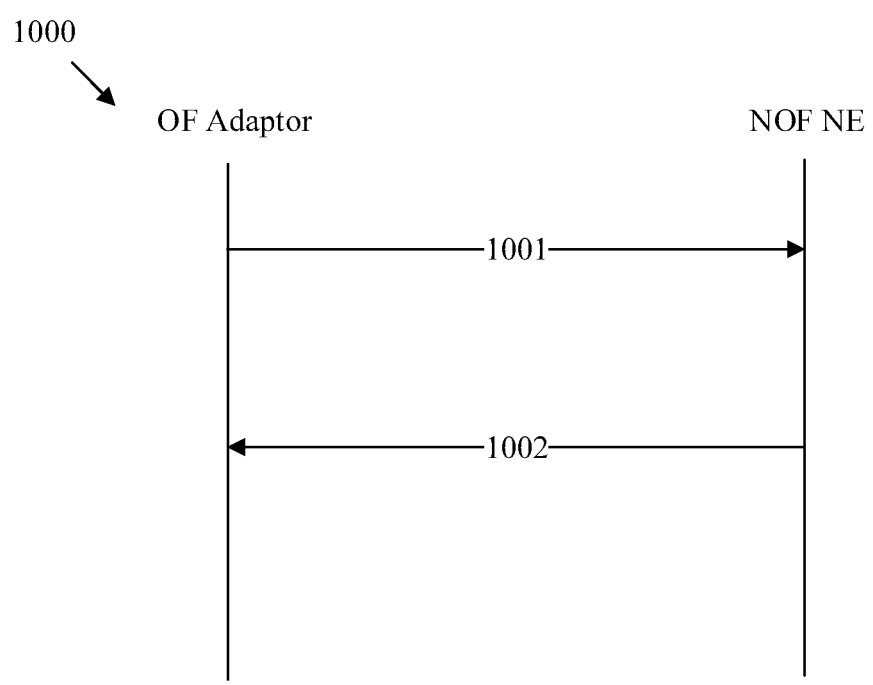
FIG. 10 is a protocol diagram of an embodiment of a method of initializing control of a NOF NE.

FIG. 10 is a protocol diagram of an embodiment of a method 1000 of initializing control of a NOF NE, which may be implemented by an OF adaptor, such as OF adaptor 130, 230, 330, and/or 400. OF NEs may be configured to contact an OF controller (e.g. via a hello message) when such OF NEs are first connected to a network. Such a contact may allow the OF controller to take control of the OF NE. However, some types of NOF NEs may not be natively configured to initialize a connection with the OF controller. Method 1000 may allow the OF adaptor and/or the OF controller to trigger a contact by a NOF NE. At step 1001, an OF adaptor may transmit a hello request message to the NOF NE in NOF format. The hello message of step 1001 may be sent to confirm that the NOF NE will allow control by the OF controller. The hello message of step 1001 may be triggered by the OF adaptor on OF adaptor startup and/or upon connection to and/or startup of the NOF NE. In an alternative embodiment, the OF controller may periodically transmit hello messages to all network OF adaptors to trigger the hello message of step 1001 for any newly joined NOF NEs. In another alternative embodiment, the OF adaptor may contact the OF controller to trigger a hello message from the OF controller upon OF adaptor startup and/or connection to and/or startup of a NOF NE.

Upon receiving the hello request message of step 1001, the NOF NE may transmit a hello reply message to the OF adaptor at step 1002. The hello reply message of step 1002 may be converted by the OF adaptor into OF format and passed on to the OF controller to notify the OF controller whether the NOF NE will accept control by the OF controller. The hello reply message may comprise an indication of the device type of the NOF NE, which may allow the adaptor to select an appropriate NOF API (e.g. NOF API 236, 336, and/or 436) for communication with the NOF NE and to initialize an OF-NOFMessageTranslator (e.g. NOFMessageTranslator 437) with appropriate translation functions, variables, objects, etc. for translating messages between OF and the NOF type specified by the hello reply. The hello reply of step 1002 may also comprise device information related to the transmitting NOF NE, such as device status, a listing of the NOF NEs ports and port status, the NOF NEs MAC address(es), the NOF NEs IP address (es), and/or any other information available at the NOF NE that may be used by the OF controller to manage the NOF NE.

Figure 11:
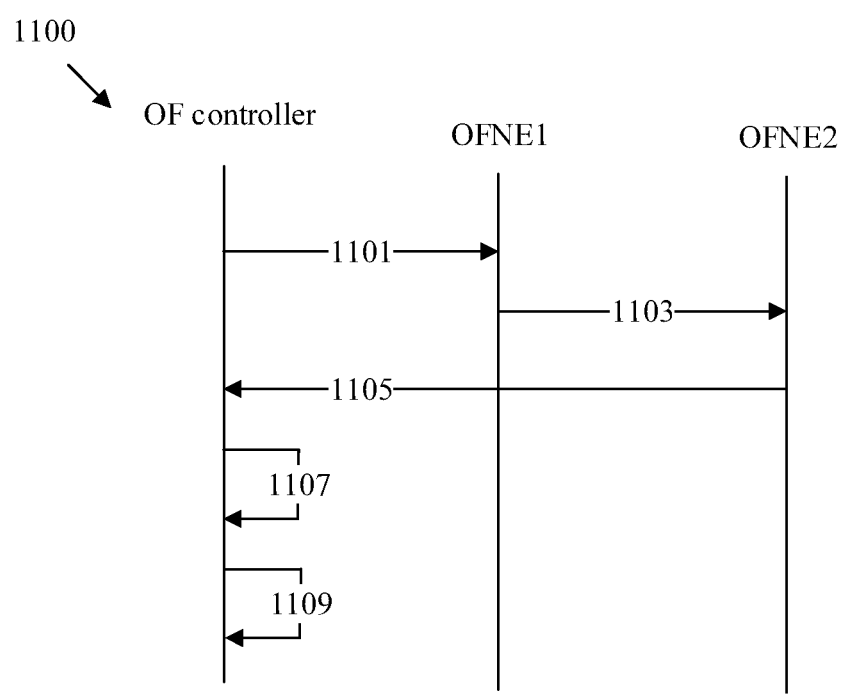
FIG. 11 is a protocol diagram of an embodiment of a method of OF network topology discovery.

FIG. 11 is a protocol diagram of an embodiment of a method 1100 of OF network topology discovery, which may be implemented by an OF controller (e.g. OF controller 110, 210, 310, and/or 410) and OF NEs (e.g. OF NEs 120). At step 1101, the OF controller may transmit an OF packet out message comprising a Link Layer Discovery Protocol (LLDP) packet to a first OF NE (OFNE1). The LLDP packet may indicate that OFNE1 should forward the LLDP packet to specified port(s). At step 1103, OFNE1 may send a packet out message comprising the LLDP packet over the specified port(s) to a second OF NE (OFNE2). At step 1105, OFNE2 may send an OF packet in message comprising the LLDP packet to the OF controller. At step 1107, the OF controller may analyze the LLDP packet to determine topology and/or resource information related OFNE1, OFNE2, and/or a link between OFNE1 and OFNE2, for example, based on changes made to the LLDP packet in transit between the NEs. At step 1109, the OF controller may store the associated topology and/or resource information in a NIB, such as NIB 416.

Figure 12:
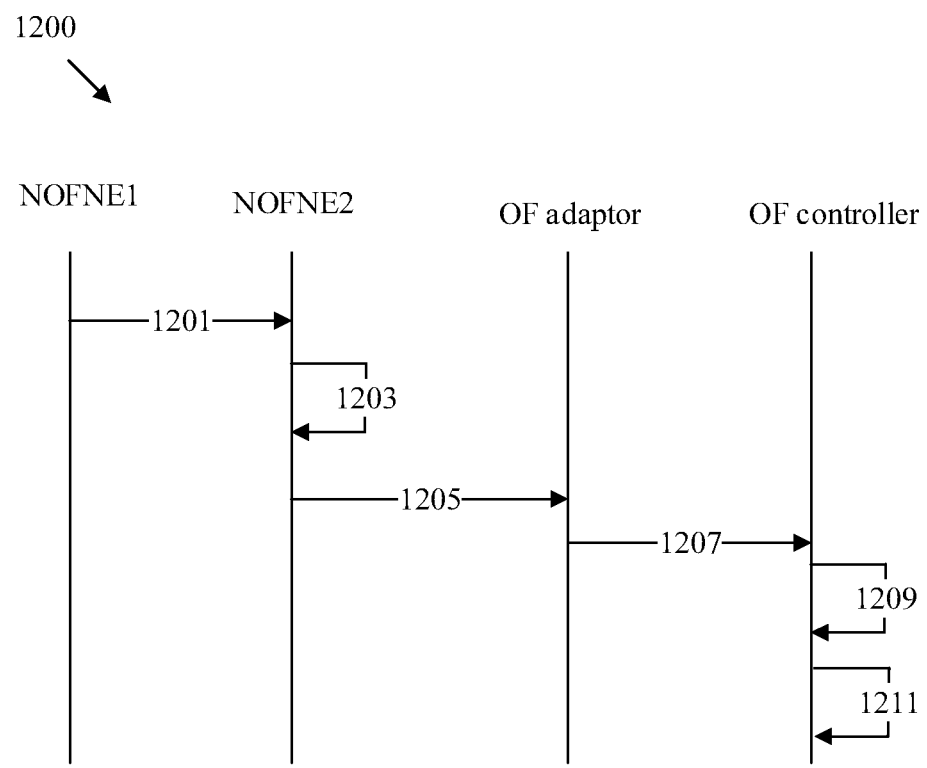
FIG. 12 is a protocol diagram of an embodiment of a method of NOF network topology discovery.

FIG. 12 is a protocol diagram of an embodiment of a method 1200 of NOF network topology discovery, which may be implemented by an OF controller (e.g. OF controller 110, 210, 310, and/or 410), OF adaptor (e.g. OF adaptor 130, 230, 330, and/or 400) and NOF NEs (e.g. NOF NEs 140, 240, and/or 340). At step 1201, a first NOF NE (NOFNE1) may flood a LLDP packet to all adjacent NEs. The LLDP packet of step 1201 may be received by a second NOF NE (NOFNE2). At step 1203, NOFNE2 may obtain link and/or resource information from the LLDP packet. At step 1205, NOFNE2 may transmit the LLDP packet to the OF adaptor. At step 1207, the OF adaptor may encapsulate the LLDP packet in an OF packet in message and forward the encapsulated message to the OF controller. At step 1209, the OF controller may parse the packet in message to obtain the resource and/or topology information. At step 1211, the OF controller may store the resource and/or topology information (e.g. relating to the link between NOFNE1 and NOFNE2) in a NIB, such as NIB 416.

Figure 13:
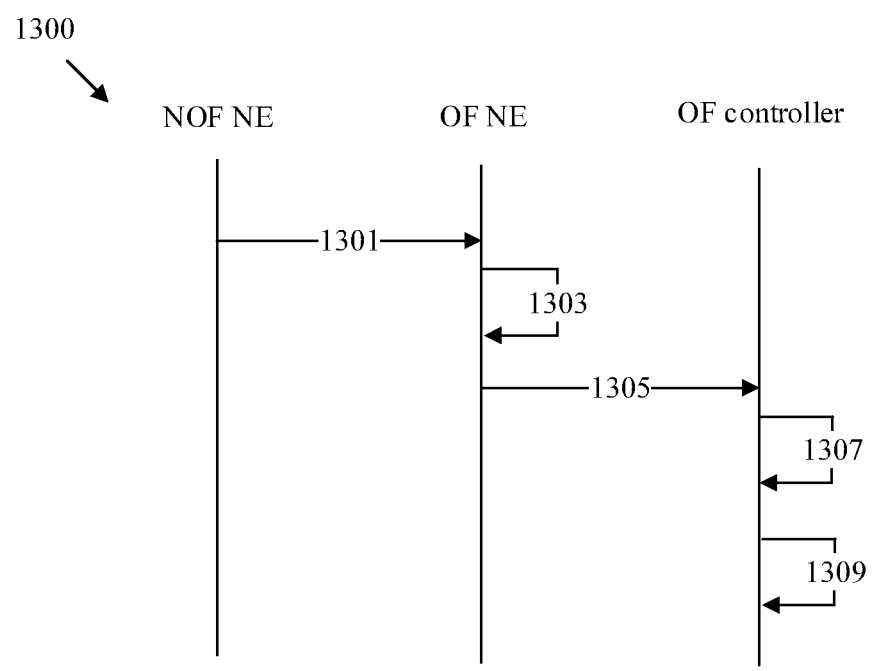
FIG. 13 is a protocol diagram of an embodiment of a method of OF to NOF topology discovery.

FIG. 13 is a protocol diagram of an embodiment of a method 1300 of OF to NOF topology discovery, which may be implemented by an OF controller (e.g. OF controller 110, 210, 310, and/or 410), OF NEs (e.g. OF NEs 120), and NOF NEs (e.g. NOF NEs 140, 240, and/or 340). At step 1301, the NOF NE may flood an LLDP packet in a manner similar to step 1201. The LLDP packet may be received by an adjacent OF NE. At step 1303, the OF NE may determine that the message is an LLDP packet, and may encapsulate the LLDP packet in an OF packet in message. At step 1305, the OF NE may transmit the packet in message comprising the LLDP packet to the OF controller. At step 1307, the OF controller may analyze the LLDP packet to obtain the resource and/or topology information (e.g. relating to the link between the NOF NE and the OF NE). At step 1309, the OF controller may store the resource and/or topology information in a NIB, such as NIB 416.

Figure 14:
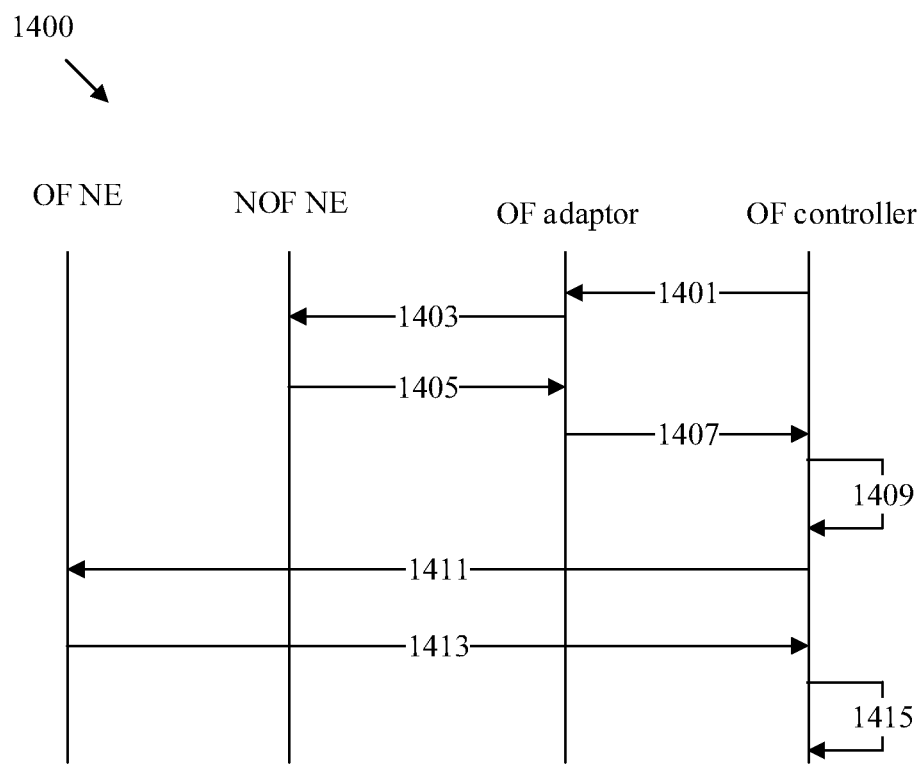
FIG. 14 is a protocol diagram of an embodiment of another method of a hybrid OF-NOF network topology discovery.

FIG. 14 is a protocol diagram of an embodiment of another method 1400 of a hybrid OF-NOF network topology discovery, which may be implemented by an OF controller (e.g. OF controller 110, 210, 310, and/or 410), OF adaptor (e.g. OF adaptor 130, 230, 330, and/or 400), OF NEs (e.g. OF NEs 120), and NOF NEs (e.g. NOF NEs 140, 240, and/or 340). Certain OF NEs and NOF NEs may be configured to obtain and store topology information of a sub-network of the hybrid network. In contrast with methods 1100, 1200, 1300, and/or 1400, the OF controller may determine to leverage such topology information stored at the NOF NE and/or OF NE level instead of recreating the topology information by transmitting a LLDP packet to each NE in the hybrid network. At step 1401, the OF controller may transmit a request for topology and/or resource information to the OF adaptor. At step 1403, the OF adaptor may translate the request into NOF formation and forward the request to the NOF NE. At step 1405, the NOF NE may transmit a topology response message to the OF adaptor. The topology response message may comprise all resource and/or topology information known to the NOF NE, a predetermined subset of the resource and/or topology information known to the NOF NE, and/or a subset of the resource and/or topology information known to the NOF NE as specified by the topology request of steps 1401 and 1403. At step 1407, the OF adaptor may convert the topology response message to OF format and forward the topology response message to the OF controller. At step 1409, the OF controller may parse the message to obtain the resource and/or topology information from the NOF NE and may store the resource and/or topology information in a NIB, such as NIB 416. At step 1411, the OF controller may transmit a request for topology and/or resource information to OF NE in a similar manner to step 1401. At step 1413, the OF NE may reply with a topology response message to the OF controller in a manner similar to step 1405. At step 1415, the OF controller may parse the message to obtain the resource and/or topology information from the OF NE and may store the resource and/or topology information in a NIB in a manner similar to step 1409. It should be noted that steps 1401 and 1409 may be performed in any order and/or substantially simultaneously. Upon completing steps 1409 and 1415, the OF controller may have access to a topology information relating to the entire hybrid network without querying each network NE.

Figure 15:
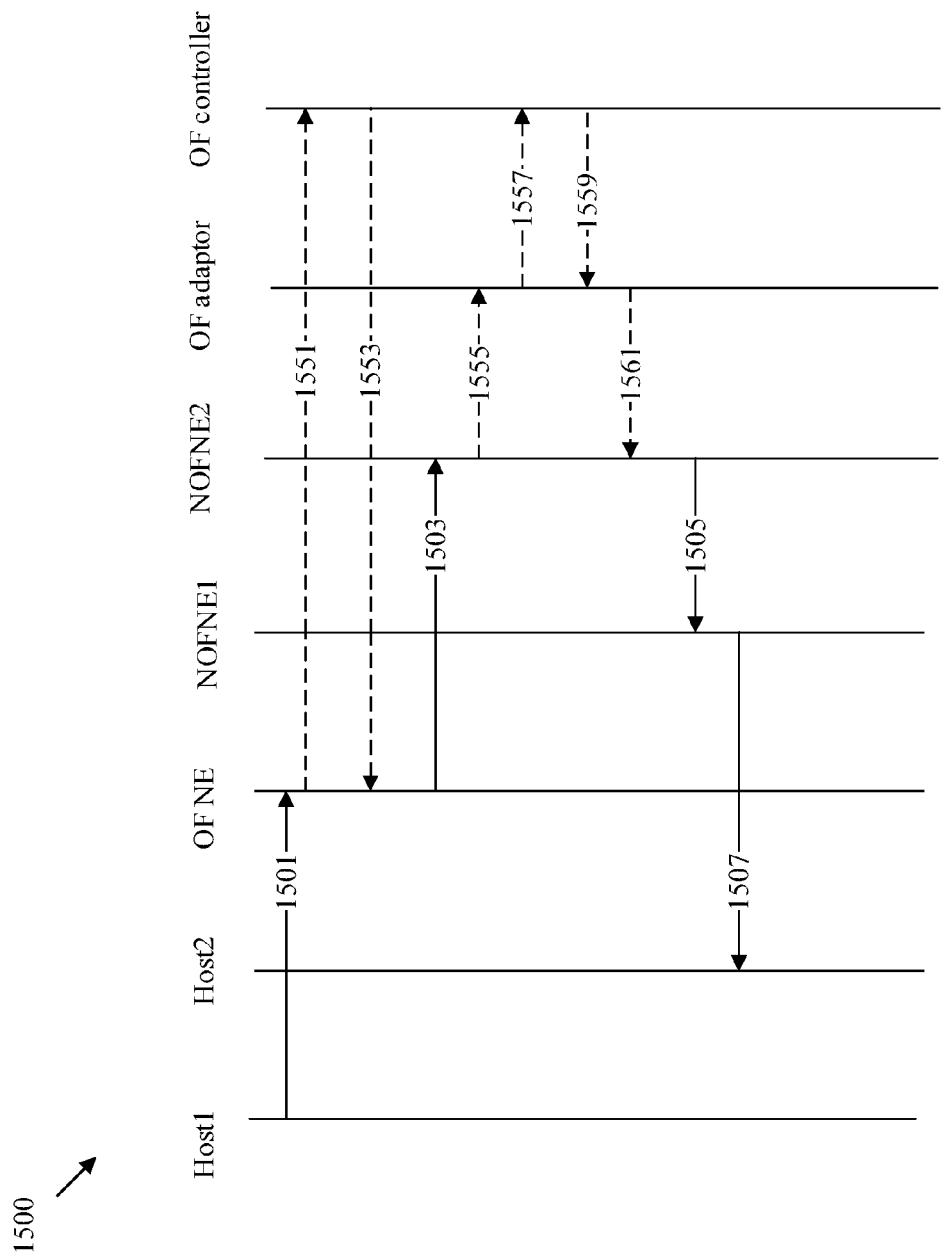
FIG. 15 is a protocol diagram of an embodiment of a method of transmitting a packet across a hybrid network.

FIG. 15 is a protocol diagram of an embodiment of a method 1500 of transmitting a packet across a hybrid network, such as network 100. For purposes of clarity, data plane communications may be illustrated as solid arrows and control plan communications may be illustrated as dashed arrows. At step 1501, a first host (Host1) may transmit a data packet toward a second host (Host2) via a hybrid network. The data packet of step 1501 may be received by an adjacent OF NE. OF NE may determine that no flow entry exists for the packet of step 1501 and may transmit an OF packet in message to the OF controller at step 1551. The OF controller may compute a path through the hybrid network based on an understanding of the complete network topology (e.g. based on methods 1100, 1200, 1300, and/or 1400) and may transmit a packet out message to the OF NE at step 1553. The packet out message may comprise a flow entry based on the computed path. At step 1503, OF NE may forward the data packet from step 1501 to NOFNE2 based on the flow entry from the OF controller. The NOFNE2 may have insufficient routing data to route the data packet received at step 1503, for example, because NOFNE2 comprises a routing table with insufficient information. At step 1555, the NOFNE2 may transmit a routing request to the OF adaptor. At step 1557, the OF adaptor may translate the routing request into an OF packet in message and forward the OF packet in message to the OF controller. At step 1559, the OF controller may respond with an OF packet out message comprising a flow entry for the NOFNE2 based on the computed path. At step 1561, the OF adaptor may translate the OF packet out message and flow entry into NOF format, for example, into a routing response with a routing table entry, and may forward the response to the NOFNE2. Based on the routing response of step 1561, the NOFNE2 may forward the data packet to another NOF NE (NOFNE1) at step 1505. NOFNE1 may be directly connected to Host2, and may forward the data packet to Host2 at step 1507 (e.g. based on a routing table). By using method 1500 (and/or methods 1000, 1100, 1200, 1300, and/or 1400), an OF controller may route a packet across a hybrid network of NOF NEs and OF NEs based on a complete understanding of the hybrid network topology.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. An OpenFlow (OF) adaptor comprising:
a physical OF port configured to communicate with an OF controller;
a physical Non-OF (NOF) port configured to communicate with a NOF switch;
a memory comprising an association between an OF protocol data and a NOF protocol data; and
at least one processor coupled to the memory, the OF port, and the NOF port, and configured to:
receive a first OF message comprising network data from the OF controller via the OF port;
translate the first OF message encoded using an OF protocol into a first NOF message encoded using a NOF protocol based on the association between the OF protocol data and the NOF protocol data, wherein the first NOF message comprises network data analogous to network data of the first OF message, and wherein the network data of the first NOF message is encoded in a format supported by the NOF switch; and
transmit the first NOF message toward the NOF switch via the NOF port.

2. The OF adaptor of claim 1, wherein the processor is further configured to:
receive a second NOF message comprising network data from the NOF switch via the NOF port, wherein the second NOF message comprises an NOF format that is not supported by the OF controller;
translate the second NOF message into a second OF message, wherein the second OF message comprises network data analogous to the second NOF message network data encoded in a format supported by the OF controller; and
transmit the second OF message toward the OF controller via the OF port.

3. The OF adaptor of claim 2, wherein the OF adaptor is configured to translate messages between the OF controller and a single NOF switch.

4. The OF adaptor of claim 2, wherein the OF adaptor is configured to translate messages between the OF controller and a plurality of NOF switches.

5. The OF adaptor of claim 1, wherein the memory comprises an updateable listing of the OF protocol data, an updateable listing of the NOF protocol data, and an updateable association between the OF protocol data and the NOF protocol data, and wherein the first OF message is translated into the first NOF message based on the updateable association.

6. An OpenFlow (OF) adaptor comprising:
a physical OF port configured to communicate with an OF controller;
a physical Non-OF (NOF) port configured to communicate with a NOF switch;
a memory comprising an association between an OF protocol data and a NOF protocol data;
a message translator coupled to the memory, the OF port and the NOF Port and configured to:
translate messages between OF format and NOF format based on a predetermined set of message type relationships and based on the association between the OF protocol data and the NOF protocol data, wherein data from a message received in a first format for the translation is encoded into a corresponding message in a second format for transmission; and
create mappings indicating the OF format and the corresponding NOF format of each translated message; and
a message mapper coupled to the OF port, the message translator, and the NOF Port and configured to:
receive and store the mappings from the message translator; and
convert messages between OF format and NOF format based on the mappings.

7. The OF adaptor of claim 6, wherein converting messages between OF format and NOF format based on the mappings comprises: receiving a NOF message from the NOF port;
querying the message mapper to determine if a mapping exists that indicates the corresponding OF format of the NOF message; and one of:

transmitting to the OF port an OF message indicated as corresponding to the NOF message in a mapping when a mapping for the NOF message exists and dropping the NOF message;

otherwise, forwarding the NOF message to the message translator for translation when a mapping for the NOF message does not exist.

8. The OF adaptor of claim 6, further comprising a protocol support memory component coupled to the message translator, wherein the protocol support memory component comprises the predetermined set of message type relationships employed by the message translator, and wherein the predetermined set of message relationships comprises a listing of the OF protocol data, a listing of the NOF protocol data, and the association between the OF protocol data and the NOF protocol data.

9. The OF adaptor of claim 6, wherein the memory is coupled to the OF port and comprising comprises an OF Application Programming Interface (API), wherein the OF API comprises a function library configured to support communication with the OF controller wherein the OF adaptor further comprises an OF Message Parser coupled to the OF port, the message translator, and the message mapper, wherein the OF Message Parser is configured to:

parse OF messages received from the OF port; and forward parsed OF messages to the message translator or the message mapper;

wherein the memory is also coupled to the NOF port and comprises a NOF API comprising a function library configured to support communication with the NOF switch;

a NOF Message Parser coupled to the NOF port, the message translator, and the message mapper, wherein the NOF Message Parser is configured to:

parse NOF messages received from the NOF port; and forward parsed NOF messages to the message translator or the message mapper.

10. The OF adaptor of claim 2, wherein the first OF message comprises information that confirms the NOF switch allows control by the OF controller, and wherein the second NOF message comprises information to notify the OF controller whether the NOF switch accepts control by the OF controller.

11. The OF adaptor of claim 10, wherein the second OF message further comprises device information of the NOF switch, and wherein the device information of the NOF switch comprises at least one of: NOF switch device type, NOF switch device status, a listing of NOF switch ports and NOF switch port status, NOF switch Media Access Control (MAC) address, and NOF switch Internet Protocol (IP) address.

12. The OF adaptor of claim 10, wherein the first OF message is an OF Hello message.

13. The OF adaptor of claim 10, wherein the second OF message is an OF Hello message.

14. The OF adaptor of claim 6, wherein the OF format message is encoded in an OF Hello message.

15. The OF adaptor of claim 4, wherein at least one NOF switch selected from the plurality of NOF switches is not compatible with the OF protocol.

16. The OF adaptor of claim 15, wherein the OF adaptor is configured to translate an OF protocol message from the OF controller into a message having a protocol compatible with the at least one NOF switch.

17. A method implemented by an OpenFlow (OF) adaptor, comprising:

storing, by a memory of the OF adaptor, an association between an OF protocol data and a Non-OF (NOF) protocol data receiving, by a receiver of the OF adaptor, a first OF message comprising network data from the OF controller via a physical OF port configured to communicate with an OF controller;

translating, by a processor coupled to the memory and the receiver, the first OF message encoded using an OF protocol into a first NOF message encoded using a NOF protocol based on the association between the OF protocol data and the NOF protocol data, wherein the first NOF message comprises network data analogous to network data of the first OF message, and wherein the network data of the first NOF message is encoded in a format supported by a NOF switch, wherein the OF adaptor comprises the physical OF port and a physical Non-OF port configured to communicate with the NOF switch;

transmitting, by a transmitter coupled to the processor, the first NOF message toward the NOF switch via the NOF port.

18. The method claim 17, further comprising storing, by the memory, an updateable listing of the OF protocol data, an updateable listing of the NOF protocol data, and an updateable association between the OF protocol data and the NOF protocol data.

19. The method claim 18, wherein the first OF message is translated into the first NOF message based on the updateable association.

20. The method of claim 17, further comprising receiving, by the receiver, second NOF message comprising network data from the NOF switch via the NOF port, wherein the second NOF message comprises an NOF format that is not supported by the OF controller.

21. The method of claim 17, further comprising translating, by the processor, the second NOF message into a second OF message, wherein the second OF message comprises network data analogous to the second NOF message network data encoded in a format supported by the OF controller.

* * * * *